Figure 2:
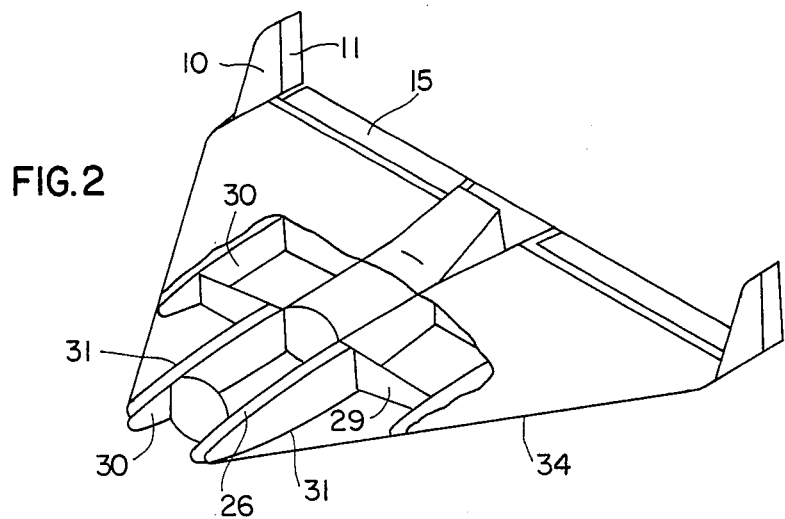

United States Patent

Friedel et al.

[11] Patent Number: 4,601,442
[45] Date of Patent: Jul. 22, 1986

[54] MISSILE WITH HIGHLY BACKSWEPT WING UNIT, IN PARTICULAR WITH DELTA WINGS

[75] Inventors: Franz Friedel, Oberteuringen; Werner Frühauf, Bermatingen; Günter Harms, Friedrichshafen; Georg Heise, Immenstaad; Heinrich Lükewille, Salem, all of Fed. Rep. of Germany

[73] Assignee: Dornier GmbH, Friedrichshafen, Fed. Rep. of Germany

[21] Appl. No.: 545,083

[22] Filed: Oct. 25, 1983

[30] Foreign Application Priority Data

Nov. 5, 1982 [DE] Fed. Rep. of Germany ....... 3240903

[51] Int. Cl.[4] .............................................. F42B 15/02
[52] U.S. Cl. ...................................... 244/3.24; 244/49
[58] Field of Search ............................ 244/3.24–3.29, 244/3.1, 49, 91

[56] References Cited

U.S. PATENT DOCUMENTS

| Re. 25,418 | 7/1963 | Grant | 244/91 |
| 3,285,542 | 11/1966 | Holmquist | 244/91 |
| 4,106,727 | 8/1978 | Ortell | 244/49 |
| 4,247,063 | 1/1981 | Jenkins | 244/3.27 |
| 4,296,894 | 10/1981 | Schnabele et al. | 244/3.27 |
| 4,410,151 | 10/1983 | Happner et al. | 244/3.27 |

Primary Examiner—Harold J. Tudor
Attorney, Agent, or Firm—Hammond & Littell, Weissenberger & Dippert

[57] ABSTRACT

Unmanned missile with strongly backswept wing unit, in particular delta wings, which is transported in a container and is launched from the container by means of an auxiliary drive after release of a lock, and which during cruise flight is drivable by a propeller engine, lateral force surfaces (25) being deployable for stabilization of the missile during cruise flight, from retraction spaces (26) in the region of the wing root of the delta wings, and further a friction clutch (64, 65) is provided at the missile which, without supply of energy from the outside, couples the standing propeller 6 with the drive motor (7) running in the container, after leaving the container.

18 Claims, 7 Drawing Figures

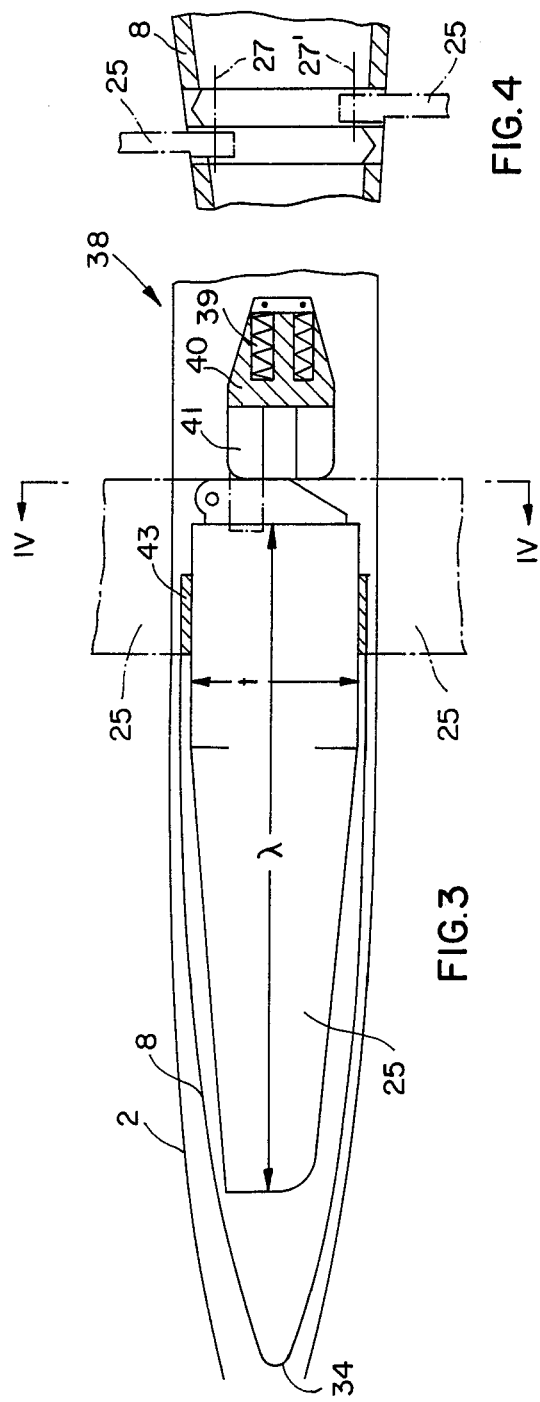
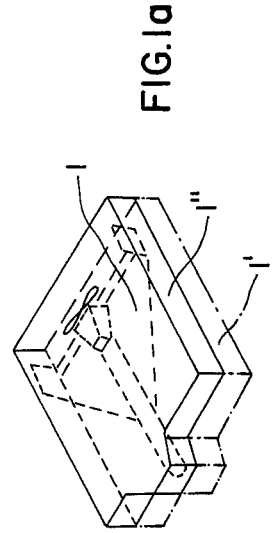

MISSILE WITH HIGHLY BACKSWEPT WING UNIT, IN PARTICULAR WITH DELTA WINGS

The invention relates to a missile with highly backswept wing unit, in particular with delta wings. Missiles of the aforementioned kind receive steering signals during target approach which through corresponding positioning devices bring about deflection movements of aerodynamically acting control surfaces.

Due to non-compensatable errors of the seeker head information, a stable approach is not possible, in particular when course corrections in conventional bank-to-turn methods become necessary.

Stable target approach can be achieved only if the course corrections are brought about by lateral force and lift control. For this purpose, lift surfaces in the plane containing the pitch and yaw axes of the missile are necessary in said missiles.

It is the object of the present invention to provide lift surfaces for lateral stabilization which become effective during target approach and bring about a given high increase of the lateral force. The lateral force surfaces, ie. stabilizers should have maximum extension and should not increase the air resistance of the missile during cruise and search flight. It is further an object of the invention to design the missile so that minimum dimensions are obtained for the missile container or silo receiver.

According to the invention, the problem posed is solved in that (a) in addition to the aerodynamic, adjustable control surfaces, i.e. fixed fins, lateral force stabilizers are arranged on either side of the vertical longitudinal median plane encompassing the x-axis, i.e. roll axis, and in mirror symmetry relative to the horizontal longitudinal median plane encompassing the y-axis, i.e. pitch axis; that (b) the lateral force stabilizers are arranged pivotable about axes in planes parallel to the vertical longitudinal median plane; and that (c) to accommodate the lateral force stabilizers, storage spaces are formed within the wing contour in the region of the wing root and before the front spar of the wing.

Due to the design of the invention, lateral force stabilizers of large extension parallel to the flow direction and perpendicular to the wings can be used, the stabilizers creating no or very little air resistance during cruise and search flight in that they are stored in spaces within the wing structure.

The arrangement of lateral force stabilizers of large extension is achieved by utilizing the form of strongly backswept wings, in particular in the region of the wing root. As the lateral force stabilizers are rotated into their extended position only when needed, i.e. during target approach, any flight impairment due to increased air resistance, caused by the lateral force stabilizers, is avoided. By extending the lateral force stabilizers in pairs into vertical positions above and below the horizontal longitudinal median plane of the missile, no change in the lateral rolling moment is caused.

The pivot point about which the lateral force stabilizers are pivoted is arranged so that the weathercock stability of the missile is not altered by the extended lateral force stabilizers. Besides, the missile container may be given much smaller dimensions with respect to its height.

According to a further advantageous development of the invention, it is provided that for coupling the propeller, which is stationary in the container, with the running drive motor a friction clutch operable from the drive motor is provided.

By such a design it becomes possible to provide a missile container of minimum dimensions, the coupling between the drive motor and the standing propeller taking place, after the missile has left the container, automatically and without any further external application of force on the clutch.

Further features will become evident from the drawing and the description of examples.

Embodiments of the invention are illustrated in the drawing which are described more specifically below.

Figure 1:
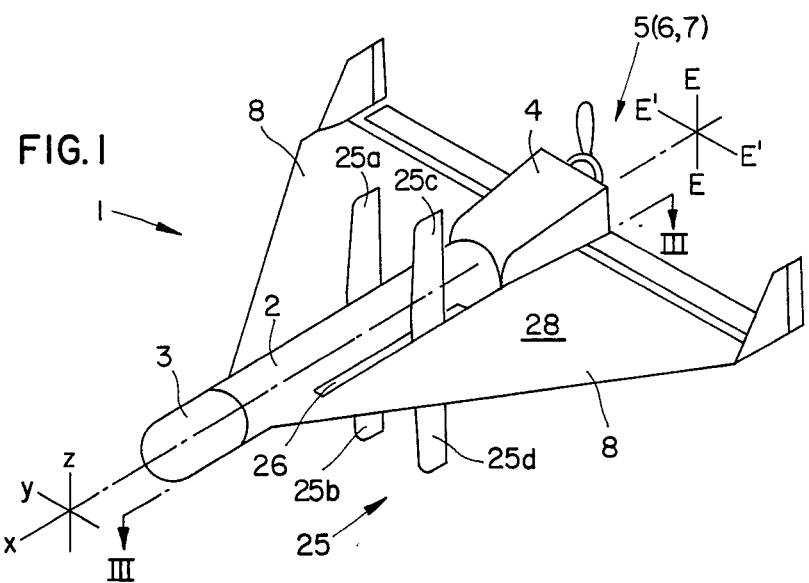
Figure 5:
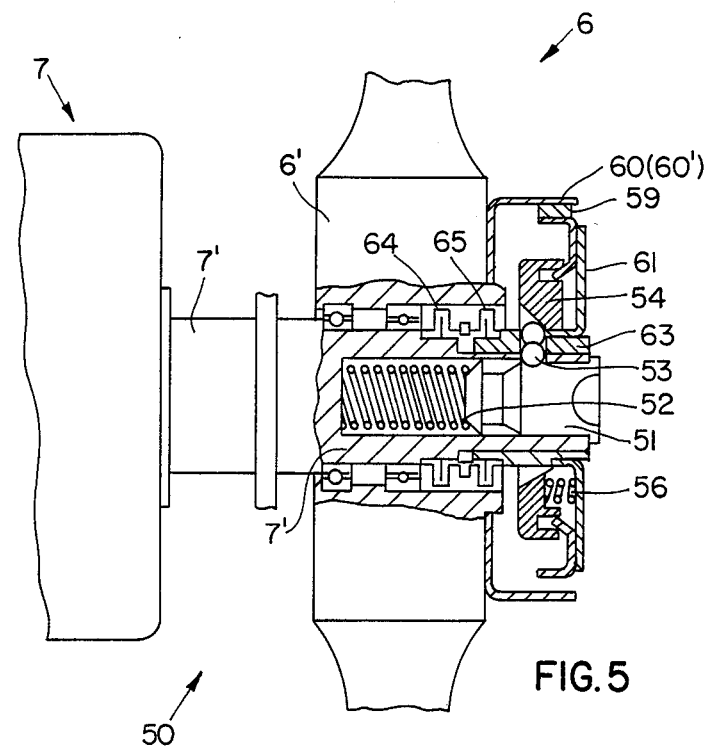
Figure 5A:
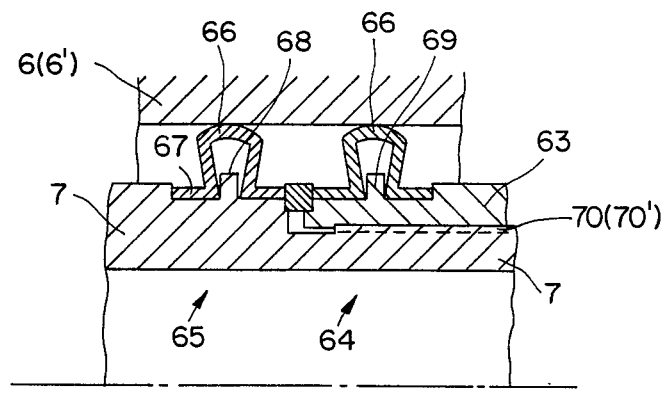

FIG. 1 shows in perspective, schematic representation a missile in which the lateral force stabilizer pairs are in extended position;

FIG. 1a, schematically and in perspective, the missile in connection with the container;

FIG. 2, in perspective and schematic representation, the design of the missile and wing structure;

FIG. 3, a partial transverse section along line III—III of FIG. 1 through a wing;

FIG. 4, in a section along line IV—IV of FIG. 3, details of the arrangement of the lateral force stabilizers;

FIG. 5, in a partial transverse section through the drive system, details of the propeller clutch in conjunction with the engine; and FIG. 5a, in a detail from FIG. 5, details of the propeller clutch in operating position.

As shown in FIGS. 1 to 4, the missile as a whole is marked 1, the fuselage 2, and the nose section of the fuselage 3. The fuselage nose 3 serves to receive a target seeking device of known design.

Further, the rear section 4 of the fuselage 2 serves to receive the drive system for cruise flight, here consisting of a piston engine 7 for driving a propeller 6 and a gear unit. Inside the fuselage section 4 a launch rocket, not shown here, is also arranged for launching the missile 1 out of the container 1', 1".

In FIG. 1a are shown containers 1' and 1" which each serve to receive a missile for transport and launch. There may be any desired number of containers, stacked vertically or side by side, e.g. for accommodation on a motor vehicle.

Launching of the missile 1 from the container 1' or 1" is done by means of the aforementioned launch rocket, with the propeller 6 remaining stationary, but with the piston engine 7 already turned on. After missile 1 has left its container 1' or 1", the drive system 5 provides the propulsion.

In the embodiment shown, the wing unit of missile 1 consists of the delta wings 8. In the region of the wing tips of both wings 8, vertical stabilizers 10 with adjustable control rudders 11 are arranged. Further, ailerons 15, which also serve as elevators, are adjustably arranged at the rear edge of both wings, for missile control. Control of the missile 1 about its transverse or pitch axis y and about its longitudinal or roll axis x is brought about by superimposed control movements of the rudders 11 or respectively the rudders 11 and ailerons 15 in known manner.

In the region of the ailerons 15 or respectively in the region of both rudders 11, there are arranged for their actuation positioning units which consist in known manner of a drive motor coupled the rudders in conjunction with a positioning gear, a radio-controlled receiver, and a switching device. These control elements, which are known as to construction and mode of action, are not shown here, to simplify matters. For the lateral guidance of the missile 1 there are arranged, according to the invention, lateral force stabilizers 25, which are to be effective in particular in the final target approach phase of the flight mission.

In the embodiment shown, two pairs of such lateral force stabilizers 25a, 25b and 25c, 25d, respectively, are provided. With respect to their chord length t or respectively their span, the stabilizer pairs 25a, 25b and 25c, 25d, respectively, extend in planes lying on either side of the vertical longitudinal median plane E—E of the missile 1 and are parallel thereto, the stabilizers 25a, 25b and 25c, 25d of each pair occupying mirror-symmetrical positions with respect to the horizontal longitudinal median plane E'—E'. The upper and lower stabilizers 25a, 25c and 25b, 25d of the two pairs are equally spaced from the vertical longitudinal median plane E—E of missile 1. It is further provided to arrange the lateral force stabilizers 25 rotatably about axes 27, 27' which are parallel to the missile's transverse or pitch axis y, for retraction into storage spaces 26 inside the encompassing wing casing 28, in order, on the one hand, to avoid the production of additional resistance by the lateral force stabilizers during the cruising and searching phase of the missile and, on the other hand, to minimize the container dimensions. The lateral force stabilizers 25 of a pair are arranged so that in the retracted state the stabilizers are close together, lying side by side, so that the chord length t of the stabilizers 25 can be designed to have a magnitude in accordance with the thickness variation of the wings (FIGS. 3, 4). Conceivable also is a design where the stablizers 25 of a pair are arranged lying near the plane E—E and are to be retracted into corresponding spaces in the fuselage 2.

FIG. 2 shows the conventional design of the missile structure and in particular of the delta wings 8. The structure of the wings 8 contains spars and ribs, as well as stringers and the casing 28. In the embodiment shown, the front spar is marked 29; it extends at a relatively great distance from the front edge of the wing, with respect to the connection of the front edge 34 to the fuselage 2, transverse to the longitudinal or roll axis x of the missile. Joined with spar 29 are ribs 30 of the fuselage 2 and additional ribs 30 of the wings 8, in known manner. At a small lateral distance from the ribs 30, fixed rib portions 31 are connected to the front spar 29 on either side of the fuselage 2. Between the ribs 30 of the fuselage and ribs 31 of each wing 8 are formed the storage spaces 26 for the retracted lateral force stabilizers 25. The storage spaces 26 in the immediate vicinity of the fuselage 2 permit—in view of the dimensions of the delta wings, with respect to the profile thickness near the fuselage and the front edge 34 of the wings 8 extending relatively far from the front spar 29 toward the fuselage nose—a free space of relatively large dimensions. The extension and the chord length t of the lateral force stabilizers 25 are designed in accordance with these dimensions to achieve satisfactory stabilization. According to the design of FIGS. 1 to 3, the stabilizers 25a, 25b and 25c, 25d of each pair are arranged so that they overlap, lying side by side inside the storage spaces 26 (FIGS. 3, 4). The contour of the stabilizers conforms approximately with the cross-sectional contour of the wings 8 in the region of the wing root. The ribs 30, 31 receive the pivot pins (not shown) having axes 27, 27' (see FIG. 4) of the stabilizers 25. The stabilizers of a pair are pivoted in opposite directions from the retracted position into the extended position. To reduce the air resistance, covers for the slot type openings in the wing casing 28, through which the lateral force stabilizers surfaces 25 are passed, may be provided.

To deploy the stabilizers 25 into the extended position, there is provided according to FIG. 3 a release device 38, which contains an actuator 40 to be actuated by prestressed helical compression springs 39. The actuator 40 has cams 41 which act on the freely pivotable lateral force stabilizers 25 in the sense of a swinging-out movement. The respective lock release for the spring-loaded actuator 40 is designed in known manner and not shown here. The release can be effected by remote control.

According to FIG. 5, a clutch unit 50 is provided for coupling the engine 7 of the drive system 5 with the freely rotatable propeller 6. The assumption for the design is that, before launching, the missile 1 is securely in its container 1' or 1" and that the securement (not shown here) is released upon launching.

The clutch unit 50, which operates without supply of external energy, consists of a release device, a shifting device operating by means of centrifugal forces, and a friction clutch arranged between the freely rotatable propeller 6, 6' and the engine drive shaft 7'. The release device contains an axially adjustable shift pin 51 which is inserted in a central bore formed in the engine drive shaft 7' and which, when the missile 1 is in the fixed position the part of the container (not shown), thereby prestressing container 1' or 1", is held in a locking position by a helical compression spring 52. Further there are provided interlocking elements 53 which can be actuated in response to axial displacement of pin 51 by spring 52 and which serve to release a shift ring 54 which is urged axially by prestressed helical compression springs 56.

By means of the shift ring 54, centrifugal weights are provided in the form of jaws 59 freely movable in the radial direction relative to a support member 61 which jaws comprise friction surfaces 60 for making contact with counter-surfaces 60' mounted on the propeller hub 6'. The radially movable jaws 59 are fixed in their inoperative position by the shift ring 54, so that there can be no frictional engagement between the friction surfaces 60 and the hub 6' counter-surfaces 60'. The support member 61 is rigidly connected to a nut member 63 mounted concentrically on the engine drive shaft 7'. This nut member is threaded to screw onto a counter-thread (motion thread) of shaft 7' and is thus relatively adjustable in the direction of the longitudinal axis of shaft 7' or respectively in the direction of the axis of rotation of the propeller 6.

The friction clutch for transmission of the engine torque to propeller 6 is a clutch which comprises U-shaped clutch elements 64 arranged between the propeller hub 6' and the drive shaft 7'. The clutch element 64 is rigidly firmly connected to the nut member 63.

Further, an additional U-shaped clutch element 65 for providing frictional engagement between the drive shaft 7' and the propeller 6 is arranged between the nut member 63 on the drive shaft 7' and the propeller hub 6'. The clutch element 65 is operable, as is also the clutch element 64, by the relative axial displacement of the nut member 63 relative to shaft 7'.

As can be seen from FIG. 5a, the clutch elements 64, 65 are rings of U-shaped profile which lie axially side by side in an annular space formed between the bore of propeller hub 6' and the motor shaft 7' or the nut member 63, respectively. The web 66 is oriented to contact the bore surface of hub 6' for producing friction therebetween, and the lateral sections 67 are directed radially with respect to the longitudinal axis of the clutch. The rings further comprise cylindrical shoulder sections 67' which are connected in the axial direction of shaft 7'. Arranged between the lateral sections, 67 of clutch element 65 is an annular projection 68 integrally formed on shaft 7' and between the lateral branches 67 of clutch element 64 is an annular projection 69 integrally formed on the nut member 63.

The clutch unit functions as follows: In the course of preparation for the launching of the missile 1 from the container 1', the engine 7 is started. At this point the missile 1 is secured in container 1'. With the clutch unit 50 in the neutral position, the propeller 6 remains stationary during rotation of the drive shaft 7'. As the securement of missile 1 is released in container 1', and as a result of the launch movement of missile 1, e.g. with the aid of a launch rocket, the prestressed helical compression spring 52 displaces the shift pin 51 in the axial direction. The interlocking elements 53 thereby release the shift ring 54 for axial movement, and by action of the prestressed helical compression spring 56 the shift ring is moved in the axial direction. By means of this axial movement the revolving jaws 59 are released and displaced radially outward by centrifugal force. The surfaces 60 of the jaws 59 come in contact with the counter-surfaces 60' mounted on the propeller hub 6' and the resulting frictional engagement causes a relative rotation between the nut member 63 and the drive shaft 7'. Consequently, by means of the engagement of threads 70, 70', the nut member 63 is displaced axially relative to the drive shaft 7' and the clutch elements 65 establish a frictional engagement between propeller hub 6' and nut member 63 and hence also with shaft 7'. The nut member 63 is advanced in the axial direction until there is no longer any slip between drive shaft 7' and propeller hub 6'. With this axial movement of the nut member 63, the clutch elements 65 are also tensioned and establish direct frictional engagement between propeller hub 6' and drive shaft 7'.

Specifically the mode of operation of the clutch elements 64, 65 is such that an axial displacement of the nut member 63 by means of thread 70 or thread 70' of the drive shaft 7' simultaneously causes abutment of the lateral branches 67 of the rings 64, 65 against the annular projections 68, 69 and an arching of web 66. Thereby the frictional engagement between the bore surface of hub 6' and the drive shaft 7' or nut member 63 respectively is established.

Essentially the clutch-coupling process takes place after missile 1 has left its launch container 1'. The clutch unit 50 here makes possible an automatic activation of the coupling process between the stationary propeller 6 and the running engine 7. The process of clutch engagement takes place without the need for the supply of energy from the outside, by means of an externally initiated shift pulse.

We claim:

1. A missile for unmanned flight to a target from a launching point, comprising:
   (a) a fuselage having a longitudinal axis defining a roll axis of said missile;
   (b) a pair of delta wings connected to said fuselage, the junction of each of said delta wings with said fuselage defining a wing root and the portion of each of said delta wings furthest from said fuselage forming a wing tip, each of said delta wings having a front edge and a back edge extending from said wing tip to said wing root, and each of said delta wings having a storage space formed therein in the vicinity of said wing root;
   (c) a pair of ailerons rotatably connected to the respective back edges of said delta wings;
   (d) a pair of fins connected to the respective wing tips of said delta wings and having rotatable rudders thereon;
   (e) a homing device mounted in the front of said fuselage for controlling said ailerons and rudders in dependence on the position of said missile relative to said target; and
   (f) a first pair of lateral stabilizers rotatably mounted in one of said storage spaces and a second pair of lateral stabilizers rotatably mounted in the other of said storage spaces, each of said stabilizers having a retracted position in which the stabilizer is inserted in said corresponding storage space and an extended position in which the stabilizer is oriented substantially perpendicular to said corresponding delta wing, the first stabilizer of each pair extending below said delta wings in its extended position and the second stabilizer of each pair extending above said delta wings in its extended position, said stabilizers being adapted to stabilize said missile about said roll axis when extended.

2. The missile of claim 1, wherein each of said stabilizers as a chord length profile and an extension in substantial conformity with the cross-sectional contour of said delta wings in the vicinity of said wing root, such that said stabilizers do not protrude outside said delta wings when in said retracted position.

3. The missile of claim 1, further comprising selectively operable deployment means for rotating each of said stabilizers from said retracted position to said extended position.

4. The missile of claim 3, wherein said deployment means comprises cams actuated by prestressed compression springs.

5. The missile of claim 1, wherein each of said storage spaces is formed between a first and second rib extending in parallel from a front spar in said respective delta wing.

6. The missile of claim 1, further comprising
   (a) a propeller mounted on the back of said fuselage for providing propulsion;
   (b) drive means for driving said propeller; and
   (c) a friction clutch means having a first position for coupling said propeller and said drive means and a second position for decoupling said propeller and said drive means.

7. The missile of claim 6, further comprising a shifting means coupled to said friction clutch means, said shifting means having first and second positions such that said propeller is coupled to said drive means by way of said friction clutch means in response to said shifting means being displaced from its first position to its second position.

8. The missile of claim 7, further comprising release means coupled to said shifting means, said release means having first and second positions such that said shifting means is secured in its first position when said release means is in its first position and said shifting means is displaced from its first position to its second position in response to said release means being displaced from its first position to its second position.

9. The missile of claim 8, wherein said shifting means comprises an engaging means which is radially displaceable by centrifugal force created by the torque of said drive means in response to said release means being displaced from its first position to its second position.

10. The missile of claim 9, wherein said propeller comprises a propeller hub having a counter-surface arranged to frictionally engage said engaging means following radial displacement of said engaging means.

11. The missile of claim 10, wherein said drive means comprises a drive shaft having a threaded portion, and said shifting means further comprises a threaded nut threadingly coupled to said drive shaft and coupled to said friction clutch means, said threaded nut being displaceable between a first position and a second position by rotation relative to said drive shaft in response to frictional engagement of said propeller hub and said engaging means.

12. The missile of claim 7, wherein said drive means comprises a drive shaft and said friction clutch means comprises first and second clutch elements, said first clutch element being coupled to said drive shaft and said second clutch element being coupled to said shifting means, said clutch elements engaging a bore formed in said propeller when said shifting means is in its second position and not engaging said bore when said shifting means is in its first position.

13. The missile of claim 8, wherein said release means comprises a shift pin axially displaceably arranged in a bore formed in said drive means, said bore having an open end and a closed end, and locking means coupled to said shift pin and to said shifting means for blocking displacement of said shifting means in dependence on the axial position of said shift pin in said bore of said drive means.

14. The missile of claim 13, wherein said release means comprises a spring arranged between the closed end of said bore of said drive means and said shift pin for urging said shift pin from a first position corresponding to said missile being mounted in a silo to a second position whereat the shifting means is released by said release means.

15. The missile of claim 12, wherein each of said clutch elements comprises a ring having a U-shaped cross section formed by a pair of lateral branches connected by a web, said drive shaft has a first annular projection formed thereon, and said shifting means has a second annular projection formed thereon, one of said clutch elements being arranged with its lateral branches on the respective sides of said first annular projection and the other of said clutch elements being arranged with its lateral branches on the respective sides of said second annular projection.

16. The missile of claim 15, wherein said shifting means comprises a threaded nut on which said second annular projection is arranged, said nut being threadingly coupled to said drive shaft such that the lateral branches of each ring are bent toward each other as said nut is axially displaced from a first position to a second position by means of rotation relative to said drive shaft.

17. A missile system comprising a missile as defined in claim 14 and a silo adapted to receive said missile, said silo having abutment means for holding said shift pin in its first position when said missile is mounted in said silo, said shift pin being urged by said spring into its second position in response to said shift pin becoming disengaged from said abutment means during launching of said missile from said silo.

18. The missile system of claim 17, wherein the height of said silo is less than the length of said propeller.

* * * * *